United States Patent
Dubourg et al.

(10) Patent No.: US 7,260,478 B2
(45) Date of Patent: Aug. 21, 2007

(54) METHOD AND DEVICE FOR DETERMINING THE RESISTIVITY IN A GEOLOGICAL FORMATION CROSSED BY A CASED WELL

(75) Inventors: Isabelle Dubourg, Chilly-Mazarin (FR); Ollivier Faivre, Beijing (CN); Gilles Rouault, Boulogne (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 54 days.

(21) Appl. No.: 10/534,101

(22) PCT Filed: Oct. 14, 2003

(86) PCT No.: PCT/EP03/11426

§ 371 (c)(1),
(2), (4) Date: May 6, 2005

(87) PCT Pub. No.: WO2004/042194

PCT Pub. Date: May 21, 2004

(65) Prior Publication Data

US 2006/0015258 A1     Jan. 19, 2006

(30) Foreign Application Priority Data

Nov. 8, 2002 (FR) .................................. 02 14016

(51) Int. Cl.
*G01V 3/38* (2006.01)
(52) U.S. Cl. ........................................... 702/7
(58) Field of Classification Search .................... 702/7, 702/6; 703/10; 324/368, 372
See application file for complete search history.

(56) References Cited

U.S. PATENT DOCUMENTS

| | | | | |
|---|---|---|---|---|
| 4,796,186 A | * | 1/1989 | Kaufman | 702/7 |
| 6,088,655 A | * | 7/2000 | Daily et al. | 702/7 |
| 6,393,363 B1 | * | 5/2002 | Wilt et al. | 702/6 |
| 2001/0026156 A1 | | 10/2001 | Dubourg et al. | |

FOREIGN PATENT DOCUMENTS

GB     2355307     4/2001

OTHER PUBLICATIONS

Klein et al: "Cement resistivity and implications for measurement of formation resistivity through casing" Proceeding of the SPE Annual technical conference and exhibition. Oct. 1993 (1193-10) pp. 365-380, XP002253142 HOUSTON.

* cited by examiner

*Primary Examiner*—Donald E McElheny, Jr.
(74) *Attorney, Agent, or Firm*—Kevin P. McEnaney; William Batzer; James L. Kurka

(57) ABSTRACT

The invention concerns a method for determining the resistivity in a formation crossed by a cased well, in which one carries out at least one resistivity log in the cased well and one uses the results of at least one resistivity log in the non-cased well, carried out in the same well previously, in order to, in at least one zone (10) of the formation in which the resistivity has not changed between the cased and non-cased condition, deduce the value of a geometric factor k conditioning the resistivity and for determining, by means of said geometric factor k and the log in the cased well, the resistivity in at least one zone (11) different to the calibration zone, in which the resistivity has varied between the non-cased condition and the cased condition.

13 Claims, 3 Drawing Sheets

METHOD AND DEVICE FOR DETERMINING THE RESISTIVITY IN A GEOLOGICAL FORMATION CROSSED BY A CASED WELL

TECHNICAL FIELD

The invention concerns the determination of the resistivity in a geological formation crossed by a cased well.

The importance of resistivity logs in oil exploration no longer needs to be demonstrated. It is known that the resistivity of a formation essentially depends on the fluid that it contains. A formation containing salty water, which is conductive, has a much lower resistivity than a formation full of hydrocarbons and, as a consequence, resistivity measurements have an indispensable value in locating hydrocarbon deposits. Resistivity logs have been very widely practised for a long time by means of electrode devices in non-cased wells, known as open holes. The presence in the well of a metallic casing that has an infinitesimal resistivity compared to the typical values for geological formations (around $2.10^{-7}$ $\Omega \cdot m$ for a steel casing compared to 1 to $10^3$ $\Omega \cdot m$ for a formation) represents a barrier to sending electrical currents in the formations surrounding the casing. The measurement of resistivity in cased wells is of a capital interest when it is carried out in a well that is producing at the level of the deposit. One can determine the position of the water—hydrocarbon interfaces and monitor how their position changes over time, with a view to monitoring the behaviour of the hydrocarbon deposit and optimising its exploitation.

STATE OF THE PRIOR ART

Patent applications FR 2 793 031 and FR 2 793 032 in particular describe examples of methods for determining the resistivity of a geological formation crossed by a cased well.

The applicant has developed a tool for determining the resistivity of a geological formation beyond the casing, known as CHFR (Cased Hole Formation Resistivity), which is a registered trade mark of the Schlumberger Company.

A current injection electrode causes a current to flow along a casing with a distant return (for example on the surface) in such a way as to allow a leakage current in the formation crossed by the well. At a given depth z, the value of the leakage current Ifor is inversely proportional to the resistivity Rt of the formation, by applying Ohm's law:

$Rt(z) = k(V_{z,\ infinite}/\text{Ifor})$ where $V_{z,\ infinite}$ represents the potential of the casing at the level z with a reference to the infinite and where k represents a geometric factor that depends on the conditions of the log and particularly on the configuration of the electrodes, the position of the return electrode on the surface and the characteristics of the casing column. The factor k can only be estimated and its precision is often not very good.

A series of voltage electrodes applied against the casing makes it possible to carry out voltage drop measurements between two electrodes in the portions of the casing on either side of the level z. Said voltage drops are a function of the leakage current Ifor and the resistance of the portions of casing between the two electrodes. A new voltage drop measurement between the electrodes, by applying current between the injection electrode and a return electrode in the casing beyond the series of voltage electrodes, without provoking leakage in the formation, makes it possible to determine the resistance of portions of casing between two voltage electrodes.

Another measurement needs to be carried out to determine the voltage $V_{z,\ infinite}$ of the casing at the considered depth z in relation to the infinity reference. By sending a continuous current in the well from the first current injection electrode, one measures the potential difference between the second injection electrode and an infinity reference electrode. The reference electrode therefore must be as far away as possible from the casing. It is generally placed on the surface.

Sometimes it is not possible to measure said voltage $V_{z,\ infinite}$ with sufficient precision, the reference electrode cannot be placed sufficiently far away from the casing or the electrical contact between the reference electrode and the ground is not good quality.

This has led to the use of an empirical formula estimating the resistivity Rt while freeing oneself from the voltage of the casing and taking into account the length b of the casing. This empirical formula is given by:

$Rt = k \cdot \text{asinh}(2z/(z-b))/\text{Ifor}$, where $\text{asinh}(2z/(z-b))$ corresponds to the hyperbolic sine arc of the quantity $2z/(z-b)$.

In addition to the aforementioned difficulties, it has been observed that the measurements of the current Ifor often suffer from a shift. This shift arises from the fact that at each depth or measuring point, the tool carries out two Ifor current measurements. Said tool comprises four electrodes for measuring the voltage placed next to each other at different depths. A first Ifor current measurement is carried out from the measurements delivered by the three shallowest electrodes, a second Ifor current measurement is carried out from measurements delivered by the three deepest electrodes. As the measured signals are very weak, small differences at the level of the two measurement chains appear linked for example to the resistance of the wires connected to said electrodes. It is very difficult to estimate this offset current.

Moreover, resistivity measurements in cased wells are affected by the cement that is introduced between the exterior wall of the casing and the interior wall of the bore hole, if the resistivity of the cement is greater than the resistivity of the formation. The resistivity of the fresh cement can be determined in the laboratory. One can determine the resistivity of the fresh cement by laboratory measurements. The resistivity of the fresh cement is typically within a range from one to ten $\Omega \cdot m$. However, once it is in place, the cement is no longer directly accessible because it is behind the casing. Its resistivity changes firstly over time and secondly with the medium in which it is placed. The resistivity measurements in the cased well may be carried out several years or several tens of years after laying the cement and throughout this time one does not know what becomes of the cement.

The cement has a porosity of around 35% and when it is in place, an ion exchange occurs between the water contained in the cement and the water contained in the formation.

Conversion charts propose, for different thicknesses of the cement layer, a correction factor to apply to the resistivity given by the tool in order to obtain the resistivity of the formation (the sought after value) and this factor takes account of the ratio between the resistivity given by the tool and the resistivity of the cement. These charts are constructed from mathematical models.

The thickness of the layer of cement may be evaluated with an acceptable precision if one knows the external diameter of the casing and the internal diameter of the well before casing. However, the use of charts does not make it possible to correct very efficiently the measured resistivity value of the formation in order to obtain the resistivity value of the formation. One only obtains an approximate value with mediocre precision.

DESCRIPTION OF THE INVENTION

The aim of the present invention is to propose a method for determining the resistivity of a formation crossed by a cased well that leads to a much better precision than that obtained through traditional methods. The aim is to better evaluate the geometric factor k in order to improve the resistivity precision and to take account, in an effective manner, of the effect relating to the cement and the offset current.

In order to achieve these aims, the present invention proposes carrying out at least one resistivity log in the cased well and using the results of at least one log in the non-cased well, carried out in the same well, in at least one zone of the formation in which the resistivity has not changed between the cased condition and non-cased condition in order to deduce the value of a geometric factor k conditioning the resistivity and in order to determine, by means of this geometric factor k and the log in the cased well, the resistivity in at least one zone different to the calibration zone, in which the resistivity has varied between the non-cased condition and the cased condition.

More precisely, the present invention proposes a method for determining, in a geological formation crossed by a cased well, the resistivity beyond the casing, comprising the following steps:

a) carrying out at least one resistivity log of the formation in the non-cased well before casing, b) carrying out at least one resistivity log of the formation in the cased well by means of a tool, c) identifying at least one zone of the formation in which the resistivity given by the log in the cased well and that given by the log in the non-cased well has remained substantially constant, d) constructing a model of the formation by a parametric inversion method from the results of the log of the non-cased well, the characteristics of the well and the casing, e) calculating the response of the tool to said model, f) comparing the response of the tool to said model and the resistivity log in the cased well in the calibration zone while changing, if necessary, in the model, a geometric factor k conditioning the resistivity as long as the comparison criterion is not satisfactory, g) deducing the geometric factor k of the model, h) calculating the resistivity of the formation by means of the resistivity log in the cased well and at least the geometric factor deduced for at least one zone of the formation different to the calibration zone.

It is preferable, when one identifies several calibration zones, that they have different resistivities in such a way as to be able to evaluate other parameters apart from the factor k.

Moreover, the construction of the model may be done with the results of the resistivity logs in the cased well if one has several resistivity logs in the cased well.

The method may comprise a step of evaluating the resistivity of cement introduced between the casing and the well by comparing the response of the tool to said model and the resistivity log in the cased well in a low resistivity calibration zone, while changing, if necessary, the resistivity of the cement in the model, as long as the comparison criterion is not satisfactory, the evaluated resistivity of the cement being used in step h. This evaluation is in particular carried out when the resistivity of the cement is greater than the resistivity of the formation.

The method may comprise a step of evaluating an offset current by comparing the response of the tool to said model and the resistivity log in the cased well in a high resistivity calibration zone, while changing, if necessary, the offset current as long as the comparison criterion is not satisfactory, the evaluated offset current being used in step h.

The method may comprise, before step d, a step of in-depth recalibrating the resistivity from the log in the non-cased well and the resistivity from the log in the cased well so that these recalibrated resistivities correspond to substantially identical depths.

The method may comprise a preliminary stage of estimating the geometric factor k that is useful for obtaining the resistivity from the resistivity log carried out in the cased well.

The method may comprise a preliminary stage of estimating an offset current that is useful for obtaining the resistivity from the resistivity log carried out in the cased well.

The method may comprise a preliminary stage of estimating the resistivity of the cement introduced between the casing and the well, said resistivity being useful for obtaining the resistivity from the resistivity log carried out in the cased well.

The model may include an initial value for the resistivity of the cement introduced between the casing and the well.

The model may comprise, when the resistivity of the formation is not homogeneous, two concentric regions having different resistivities separated by an interface, one of the regions being close to the well, the other farther away.

Moreover, the method may comprise a step of carrying out at least one log of the section of capture that makes it possible to deduce, knowing the salinity in the near region, the resistivity in the near region, then a step of calculating, by means of the model, in at least one zone different to the calibration zone, the resistivity in the distant region and the position of the interface.

The present invention also concerns a method for determining the salinity of the water and/or the saturation in water existing in a substantially homogeneous formation crossed by a cased well. It consists in carrying out at least one log of the section of capture in the cased well, and combining the results of the log of the section of capture with the resistivity determined by the method for determining the resistivity thus defined, in order to determine the salinity and/or the saturation.

BRIEF DESCRIPTION OF THE DRAWINGS

The present invention will be more clearly understood on reading the description of the embodiments that are given, purely by way of indication and in nowise limitative, and by referring to the appended drawings in which.

DETAILED DESCRIPTION OF SPECIFIC EMBODIMENTS

Figure 1:
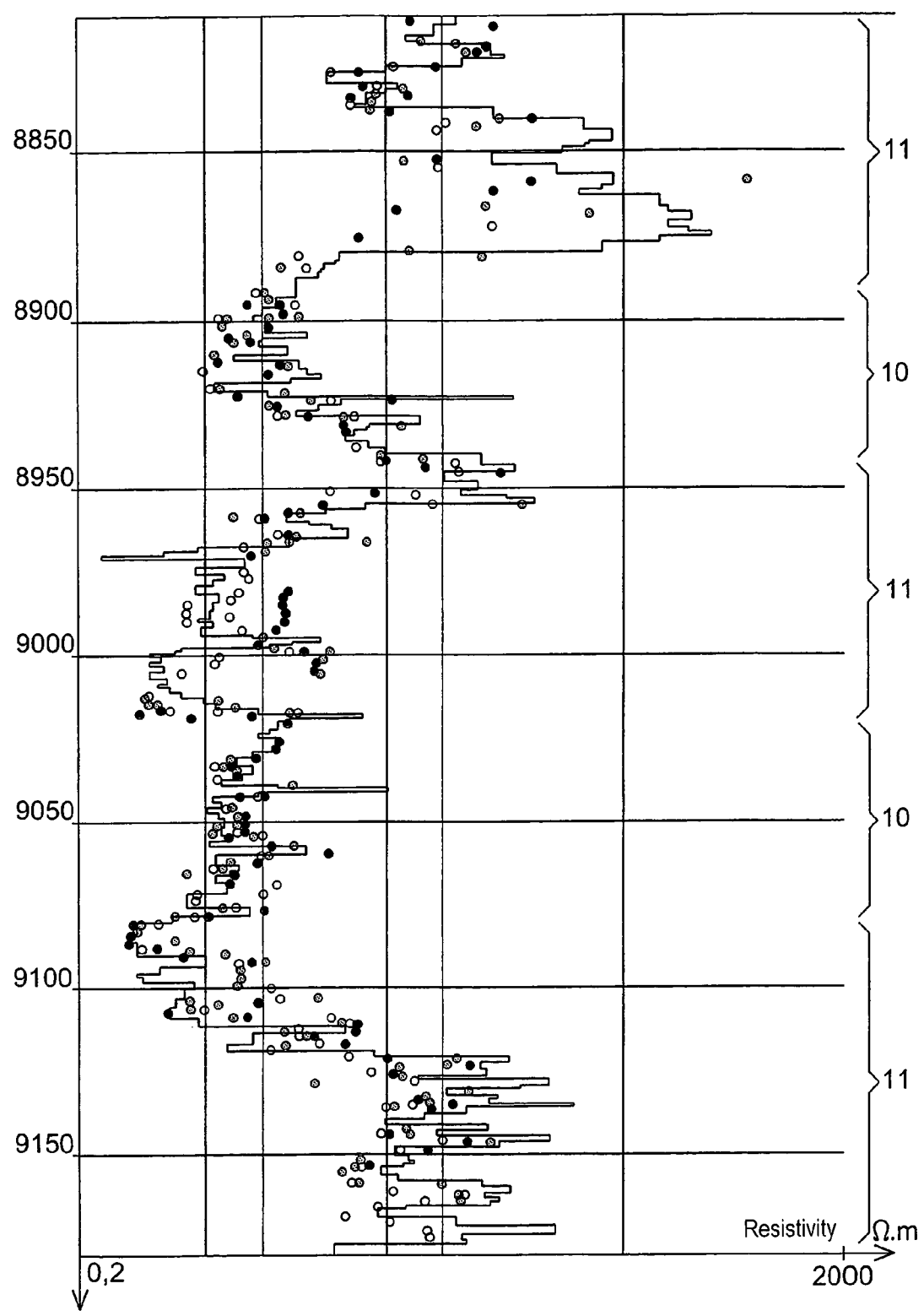
FIG. 1 shows a log carried out in a non-cased well and logs carried out in a cased well, said logs enabling the calibration zones to be identified.

We will now refer to FIG. 1 which shows, in the form of a solid line curve, the results of a resistivity log in a formation, said log having been carried out in a non-cased well between the depth of 8800 feet (2682 metres) and 9150 feet (2788 metres). The resistivity is represented with a logarithmic scale that covers the range $2.10^{-1}$ $\Omega \cdot m$ to $2.10^3$ $\Omega \cdot m$. FIG. 1 shows the results of three resistivity logs carried out successively at intervals of six months in the same cased well. These three logs are illustrated by black, grey and white points. Calibration zones 10 are marked on FIG. 1. They correspond to zones in the formation in which the resistivity has remained substantially constant between the measurements in the non-cased well and the measurements made later, at various times, in the cased well. Said calibration zones extend between around 8880 feet (2682 metres) and 8940 feet (2717 metres) and between around 9020 feet (2742 metres) and 9080 feet (2760 metres). They are situated at different depths. On either side of said calibration zones 10 are zones 11 in which the resistivity has changed between the cased condition and the non-cased condition. Said zones 11 are qualified in the following description as zones distinct from the calibration zones.

Figure 2:
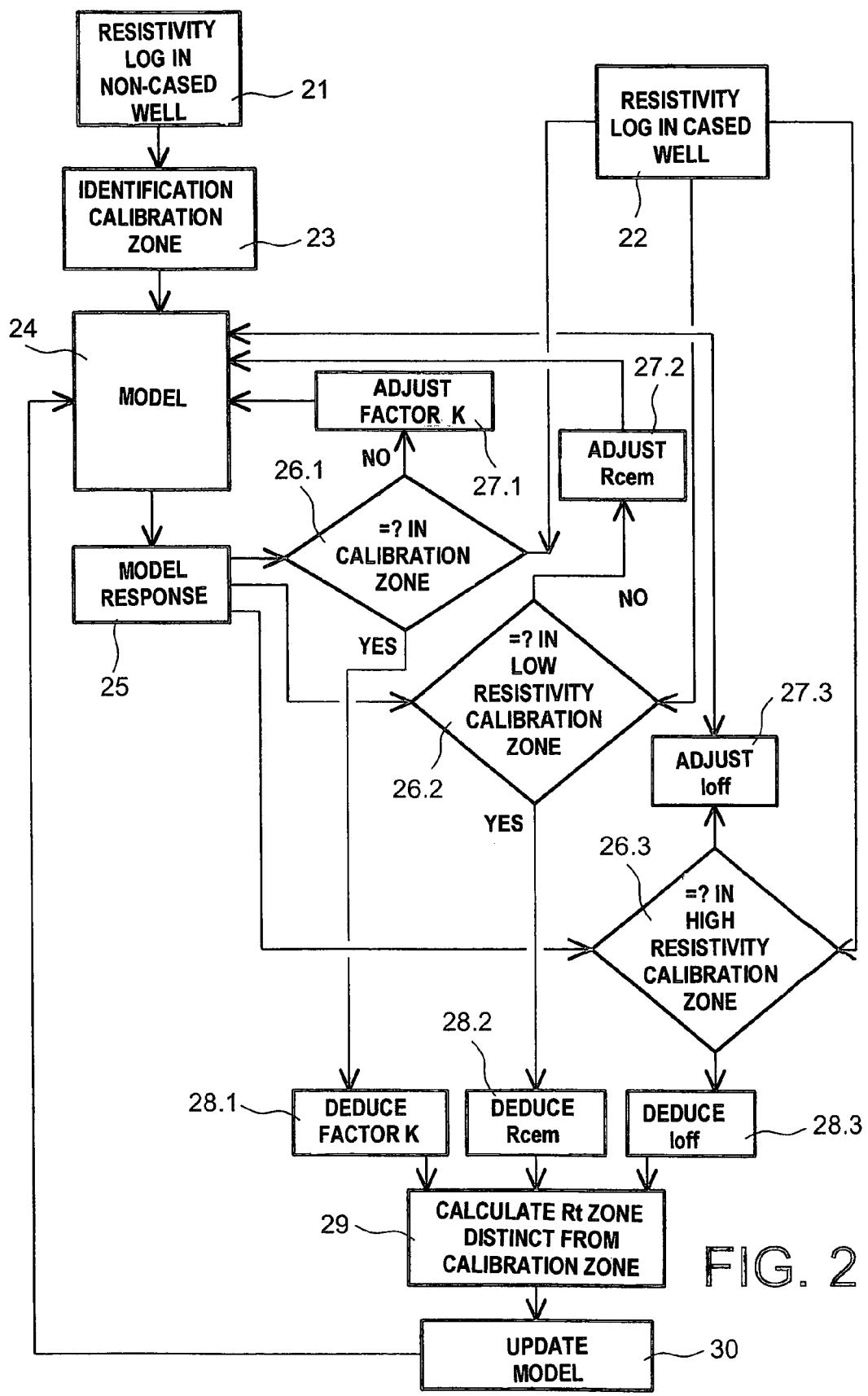
FIG. 2 shows a schematic block diagram concerning the method for determining the resistivity of a formation crossed by a cased well according to the invention.

We will now examine the different steps used to determine the resistivity in a formation crossed by a cased well according to the method of the invention. We will refer to FIG. 2.

One carries out at least one resistivity log in the non-cased well (block 21). Performing resistivity logs in non-cased wells is a conventional technique and well known in the oil sector. The tools that are used have electrodes from which galvanic currents or Foucault currents are created in the formation. Said tools give, at each of the depths at which the measurements are carried out, a series of resistivity values at this depth for different distances from the well.

One thus determines with the log in the non-cased well when the formation is homogeneous, in other words when its resistivity is substantially constant at a given depth whatever the distance from the well, the resistivity Rt.

If the formation is not homogeneous, for example if water has been injected into the well during the boring, one finds around the well two substantially concentric regions, the nearest to the well is invaded by drilling mud and its resistivity is Rxo, the furthest away from the well is blank, its resistivity is Rt and one strives to find out how it changes over time. The interface between the two regions is found at a distance di from the axis of the bored well. The log in the non-cased well makes it possible to determine Rt, Rxo and di.

Later, one carries out at least one resistivity log in the cased well by means of a measuring and recording tool (block 22). Said tool may be the tool known as CHFR.

A preliminary estimation of the geometric factor k of the offset current and/or the resistivity of the cement is useful for obtaining the resistivity of the log in the cased well.

A preliminary estimation of an offset current may be useful for obtaining the resistivity from the resistivity log carried out in the cased well.

One identifies at least one calibration zone 10 (block 23). This zone is used to determine the geometric factor k.

If several parameters other than the geometric factor k have to be determined, such as Rcem, the resistivity of the cement, and Ioff, the offset current, it is then preferable to identify several calibration zones 10 in which the resistivity Rt takes different values.

One constructs a mathematical model of the formation crossed by the cased well (block 24). Said construction may be constructed from, in particular, the resistivities measured and delivered by the resistivity log carried out in the non-cased well. One also uses, on the one hand, the electrical data measured in the cased well and, on the other hand, the characteristics of the cased well such as the bore diameter and the exterior diameter of the casing, which makes it possible to calculate the thickness of the cement. An initial value of resistivity of the cement is introduced. It may be adjusted if necessary later, since the resistivity of the cement varies over time.

After having carried out a first resistivity log in the cased well, the model is constructed with the results of the resistivity log in the non-cased well. Then, if other resistivity logs are carried out in the cased well, the model may be constructed from previous logs, in other words logs in the non-cased well and in the cased well.

Said model of layers making up the formation translates the variation in the resistivity of the formation as a function of the distance from the bore axis.

One calculates the response that the tool would give applied to the formation of the model (block 25).

This calculated response is given for each of the depths at which the tool has carried out measurements during the log in the cased well. Said response corresponds, for a given depth z, to the current flowing in the formation and, if appropriate, the voltage of the casing at this depth.

One then compares (block 26.1), in a calibration zone, the resistivity Rt from the model and the resistivity Rt given by the tool during the log in the cased well. If these two resistivities match, one deduces from the model a value for the factor k. If there is no matching, one changes the model via an inverse iteration method by making the factor k vary until matching is achieved (block 27.1).

With the value of the factor k that is deduced (block 28.1), one can recalculate the value of the resistivity Rt in the formation, in at least one zone distinct from a calibration zone, in other words a zone in which the resistivity has changed between the log in the non-cased well and the log in the cased well (block 29). All of the calibration zones and all of the zones distinct from the calibration zones together constitute the formation crossed by the well. The factor k is assumed to be constant throughout the log. The value of the voltage $V_{z,\ infinite}$ is measured or even modelled.

Said calibration zones thus serve to adjust the parameters in such a way that the resistivity Rt given by the log in the cased well and that given by the log in the non-cased well are identical.

One may then update the model with the resistivity values Rt determined thereof (block 30).

If the resistivity of the cement Rcem has to be taken into account, in other words if it is higher than that of the formation, before recalculating the value of resistivity Rt and updating the model, one again compares the resistivity given by the model and the resistivity given by the tool during the log in the cased well, in a calibration zone having a low resistivity (block 26.2). As long as there if no match, one changes the model as before by varying Rcem (block 27.2). Matching is obtained with a value of Rcem that is going to be used to make a correction to the resistivity value Rt (block 28.2). Said Rcem value is used to calculate Rt in at least one zone distinct from a calibration zone and to update the model. One assumes that the resistivity of the cement is substantially constant whatever the considered depth.

If the offset current Ioff has to be taken into account, one carries out in the same way a comparison between the resistivity given by the model and the resistivity given by the tool during the log of the cased well, in a calibration zone with high resistivity (26.3) and one varies Ioff for as long as there is no match (block 27.3). When a match is obtained (block 28.3), one deduces from this the value of the offset current Ioff. One may then refine the resistivity value Rt by taking into account the effect of the offset current Ioff and updating the model with these values. One assumes that the value of Ioff is constant over the whole log.

Such a method for determining the resistivity of a geological formation crossed by a cased well may be used to determine the saturation in water Sxo of the section of capture of water Σwat in the formation and/or other parameters that are linked to the saturation Sxo and the section of capture Σwat. Water is inevitably found in formations containing hydrocarbons. One condition is that the formation is substantially homogeneous, in other words it has, for a given depth, a resistivity substantially constant both near the well and farther away. This knowledge is very interesting because it allows the quantity of hydrocarbons remaining in the reservoir to be assessed.

One carries out at least one log of the section of capture Σ in the formation by means of a nuclear tool such as the tool known as TDT (Thermal Decay Time) or as RST (Reservoir Saturation Tool), the names of these tools being trademarks registered by the Schlumberger Company.

Said tools comprise a high energy neutron generator that is lowered into the cased well and which is controlled from the surface. Said tools subject the formation to a brief emission of neutrons. The neutrons enter into collision with the cores of various elements present in the formation. They move to the thermal condition. A certain fraction of thermal neutrons is absorbed per unit of time. One deduces the effective section of capture Σ (in $10^{-3}$ cm$^2$/cm$^3$ called unit of capture or sigma unit) from the intrinsic time of decay required for an initial number of thermal neutrons in the formation to be divided by e (Neper number). This effective section is in fact normalised to a volume of one cubic centimeter and thus expressed in cm$^2$/cm$^3$. One uses a scintillation counter as a detector, adjusted to be sensitive to low energy rays.

When the formation is homogeneous, the resistivity log and that of the section of capture Σ correspond to the same parameters of the formation and, in particular, the same saturation in water Sxo and the same water salinity Σw. The values of these two parameters may be deduced as a function of the depth.

On the other hand, when the formation is not homogeneous, the two logs correspond to different water saturation values. In fact, electrical measurement tools make it possible to carry out investigations far from the boring, for example around one or two meters, whereas nuclear measurement tools only reach several tens of centimeters. This inhomogeneity is in particular noticeable when the formation contains a water pocket. This water could have been injected from the surface, especially to displace the hydrocarbons towards a production well. This makes it possible to estimate the quantity of hydrocarbons in the formation.

Figure 3:
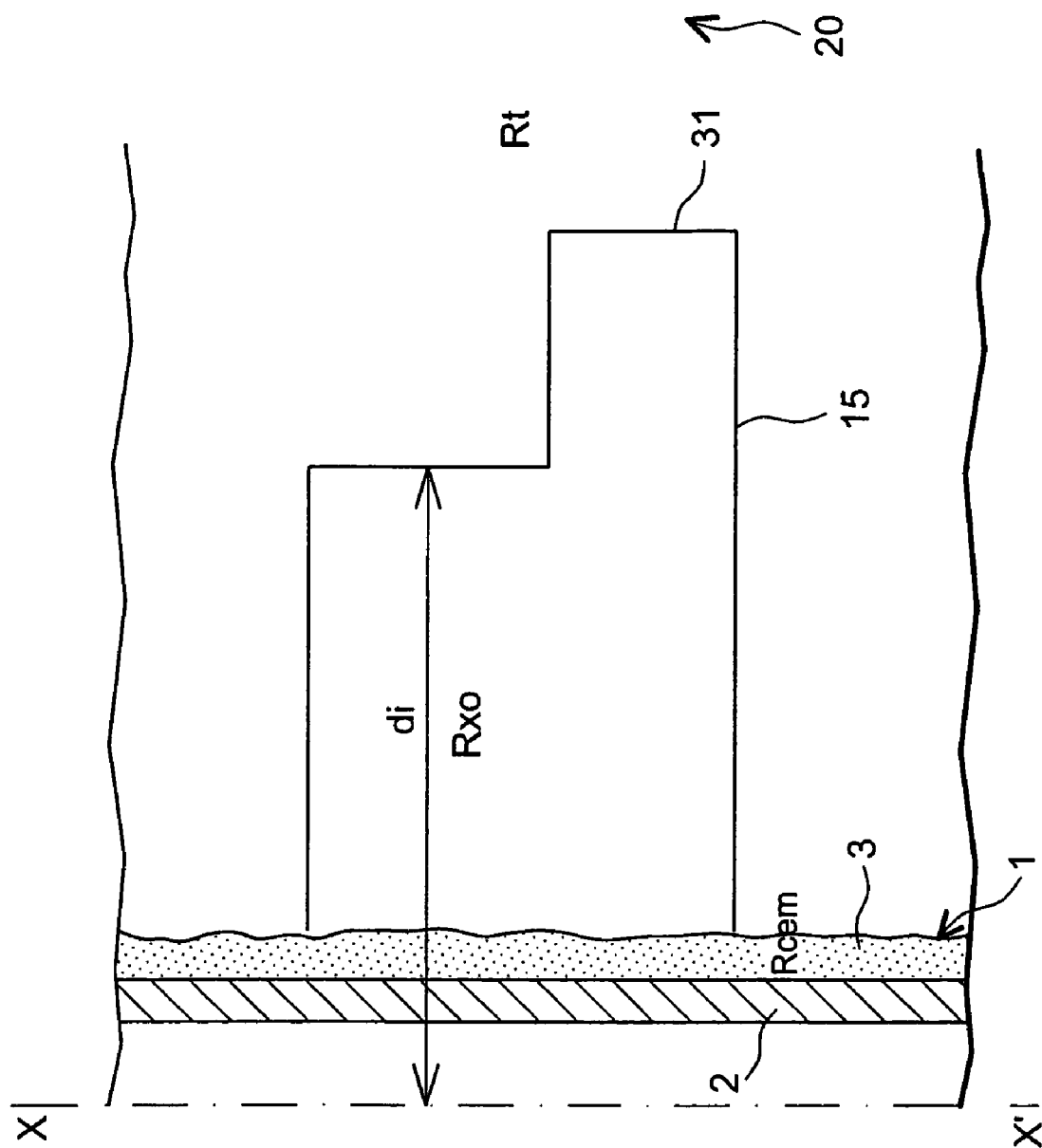
FIG. 3 shows a schematic representation of two concentric regions of the formation having different resistivities.

One may then define at a given depth in the formation two substantially concentric regions 15, 20 that have different resistivities. The region 15 is situated near to the bored well I and has a resistivity Rxo. The region 20 is farther away from the well and has a resistivity Rt. Such regions are schematically shown in FIG. 3. The interface 31 between the region 15 and the region 20 is situated at a distance di from the axis XX' of the bored well 1. Cement 3 with resistivity Rcem is inserted between the casing referenced 2 and the bored well 1.

One assumes that the salinity of the water that is situated in the near region 15 and the far region 20 is known. This information may be obtained by analysing rock samples taken from the two regions.

In a porous hydrocarbons reservoir containing water, the response in the section of capture of the nuclear tool is expressed in the following manner:

$$\Sigma_{log} = \Phi Sw \Sigma w + \Phi(1-Sw)\Sigma h + Vmat\Sigma mat$$

where Φ is the porosity of the formation in the near region 15, Sw the saturation in water in the near region, Σw the section of capture of water in the near region, Σh the section of capture of hydrocarbons, Vmat the fraction of the volume occupied by the rock compared to the total volume of the formation and Σmat the section of capture of the rock.

The parameters Φ, Σh, Vmat and Σmat are assumed to be known from the resistivity log carried out in the non-cased well or from other observations made during the construction of the resistivity model. The value of Σw is obtained from analysing samples.

From the log in the section of capture, one deduces Sw. From the salinity of the water in the near region 15, one deduces the resistivity Rxo in the near region.

In the model defined previously, one has introduced the two radial regions 15, 20 and the value of the near resistivity Rxo.

One may deduce from this the resistivity value Rt and the value of the distance di in the zones distinct from the calibration zones.

Although a certain embodiment of the present invention has been represented and described in a detailed manner, it will be understood that other changes and modifications may be made without going beyond the scope of the invention. In particular, the order of the steps of the method is not imperative.

The invention claimed is:

1. Method for determining, in a geological formation crossed by a cased well, the resistivity of the formation beyond the casing comprising the following steps:
   a) carrying out at least one resistivity log of the formation in the non-cased well before casing,
   b) carrying out at least one resistivity log of the formation in the cased well by means of a tool,
   c) identifying at least one calibration zone of the formation in which the resistivity given by the log in the cased well and that given by the log in the non-cased well has remained substantially constant,
   d) constructing a model of the formation by a parametric inversion method from the results of the log in the non-cased well and the characteristics of the well and the casing,
   e) calculating the response of the tool to said model,
   f) comparing the response of the tool to said model and the resistivity log in the cased well in the calibration zone while changing, if necessary, in the model, a geometric factor k conditioning the resistivity as long as the comparison criterion is not satisfactory,
   g) deducing when comparison criterion is satisfactory, the geometric factor k of the model,
   h) determining the resistivity of the formation beyond the casing by calculation using the resistivity log in the cased well and at least the geometric factor k deduced for at least one zone of the formation different to the calibration zone, and i) performing one of recording and logging of the determined resistivity, and of updating the model of the formation based on the determined resistivity.

2. Method according to claim 1, wherein when several calibration zones are determined, they have different resistivities.

3. Meted according to claim 2, wherein it comprises a step of evaluating the resistivity (Rcem) of a cement introduced between the casing and the well by comparing the response of the tool to said model and the resistivity log in the cased well in a low resistivity calibration zone while changing, if necessary, the resistivity of the cement in the model, as long as the comparison criterion is not satisfactory, the evaluated resistivity of the cement being used in step h.

4. Method according to either of claims 2, wherein it comprises a step of evaluating an offset current (Ioff) by comparison between the response of the tool to said model and the resistivity log in the cased well in a high resistivity calibration zone, by changing, if necessary, the offset current as long as the comparison criterion is not satisfactory, the evaluated offset current being used in step h.

5. Method according claim 1, wherein the construction of the model is moreover carried out with the results of the resistivity logs in the cased well if one has several resistivity logs in the cased well.

6. Method according to claim 1, wherein it comprises, before step d, a step of in-depth recalibration of the resistivity from the log in the non-cased well and the resistivity from the log in the cased well, so that said recalibrated resistivities correspond to substantially identical depths.

7. Method according to claim 1, wherein it comprises a preliminary step of estimating the geometric factor k which is useful for obtaining the resistivity from the resistivity log carried out in the cased well.

8. Method according to claim 1, wherein it comprises a preliminary step of estimating an offset current (Ioff) which is useful for obtaining the resistivity from the resistivity log carried out in the cased well.

9. Method according to claim 1, wherein it comprises a preliminary step of estimating the resistivity of the cement (Rcem) introduced between the casing and the well, said resistivity being useful for obtaining the resistivity from the resistivity log carried out in the cased well.

10. Method according to claim 1, wherein the model integrates an initial resistivity value (Rcem) for the cement introduced between the casing (1) and the well (2).

11. Method according to claim 1, wherein the model comprises two concentric regions (15, 20) having different resistivities separated by an interface (31), one of the regions being close to the well, the other further away.

12. Method according to claim 11, wherein it comprises a step of carrying out at least one log of the section of capture that makes it possible to deduce, knowing the salinity in the near region, the resistivity (Rxo) in the near region, then a step of calculating, by means of the model, in at least one zone distinct from the calibration zone, the resistivity in the distant region (Rt) and the position of the interface (di).

13. Method according to claim 1, wherein the method consists of carrying out a log of a section of water capture in a substantially homogenous formation crossed by the cased well, and combining the results of the log of the section of capture with the determined resistivity, in order to determine the salinity and/or the saturation of the water.

* * * * *